(12) United States Patent
Lee et al.

(10) Patent No.: US 10,204,071 B2
(45) Date of Patent: Feb. 12, 2019

(54) RING NETWORK SYSTEM USING PERIPHERAL COMPONENT INTERCONNECT EXPRESS AND SETTING METHOD THEREOF

(71) Applicant: INDUSTRIAL TECHNOLOGY RESEARCH INSTITUTE, Hsinchu (TW)

(72) Inventors: Chao-Tang Lee, Pingtung County (TW); Peng-Kai Hsu, Taoyuan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 16/053,605

(22) Filed: Aug. 2, 2018

(65) Prior Publication Data

US 2018/0341607 A1 Nov. 29, 2018

Related U.S. Application Data

(63) Continuation-in-part of application No. 15/390,344, filed on Dec. 23, 2016, now abandoned.

(30) Foreign Application Priority Data

Dec. 22, 2016 (TW) .............................. 105142669 A (51) Int. Cl.
*G06F 13/40* (2006.01)
*G06F 13/42* (2006.01)

(52) U.S. Cl.
CPC ........ *G06F 13/404* (2013.01); *G06F 13/4282* (2013.01); *G06F 2213/0026* (2013.01)

(58) Field of Classification Search
CPC ....................................................... G06F 13/40
See application file for complete search history.

(56) References Cited

U.S. PATENT DOCUMENTS

2013/0179722 A1* 7/2013 Smith ................. G06F 13/4027
714/4.5

\* cited by examiner

*Primary Examiner* — David E Martinez
(74) *Attorney, Agent, or Firm* — Maschoff Brennan (57) ABSTRACT

A ring network system using peripheral component interconnect express (PCIe) is disclosed. The ring network system includes N PCIe bridges. Each of the N PCIe bridges is connected to an individual server and includes a first port and a second port. The second port of an ith PCIe bridge of the N PCIe bridges is connected to the first port of an ((i mod N)+1)th PCIe bridge of the N PCIe bridges. Each of the N PCIe bridges includes an address mapping chip. The address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges.

14 Claims, 10 Drawing Sheets

RING NETWORK SYSTEM USING PERIPHERAL COMPONENT INTERCONNECT EXPRESS AND SETTING METHOD THEREOF

CROSS-REFERENCE TO RELATED APPLICATIONS

This non-provisional application claims priority under 35 U.S.C. § 120 on patent application Ser. No. 15/390,344 filed in U.S. on Dec. 23, 2016 which claims priority under 35 U.S.C. § 119(a) on Patent Application No(s). 105142669 filed in Taiwan, R.O.C. on Dec. 22, 2016, the entire contents of which are hereby incorporated by reference.

TECHNICAL FIELD

The disclosure relates to a ring network system using peripheral component interconnect express and setting method thereof.

BACKGROUND

Nowadays, a plenty of communication standards are used for communicating, accessing data or exchanging information in systems or servers. One of the communication standards is peripheral component interconnect express (PCIe), which is used widely. PCIe is an interface mainly configured to connect a plurality of PCIe devices in a server. In a structure using PCIe, a control end (master) is connected to a plurality of PCIe devices (slaves), and the control end (master) controls those PCIe devices (slaves). However, since a server has only a single PCIe system in general, it is hard to connect a plurality of servers together. Therefore, it is not that easy for a plurality of servers to access or exchange information with each other, so that resources sharing between the servers may not be easily achieved.

SUMMARY

A ring network system using peripheral component interconnect express (PCIe) is disclosed according to an embodiment of the invention. The ring network system includes N PCIe bridges. Each of the N PCIe bridges is connected to an individual server and includes a first port and a second port, wherein the second port of an ith PCIe bridge of the N PCIe bridges is connected to the first port of an ((i mod N)+1)th PCIe bridge of the N PCIe bridges, N is a positive integer greater than or equal to 3, and i is a positive integer less than or equal to N. Each of the N PCIe bridges includes an address mapping chip, and the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges. The address mapping chip of each of the N PCIe bridges sets a first address table and a second address table, and each of the N PCIe bridges further includes a plurality of base address registers and a plurality of translation registers. Each of the plurality of base address is configured to deliver a base address packet of one of the N PCIe bridges according to the first address table or the second address table. The plurality of translation registers set to configurably edit a destination address of the base address packet according to the mapping relationship for forwarding the base address packet; wherein the first address table of the ith PCIe bridge is set to configurably map to a system address of an (((i−2+N) mod N)+1)th server connected to the ith PCIe bridge.

A ring network system using peripheral component interconnect express (PCIe) is disclosed according to another embodiment of the invention. The ring network system includes N PCIe bridges. Each of the N PCIe bridges is connected to an individual server and includes a first port and a second port, wherein the second port of an ith PCIe bridge of the N PCIe bridges is connected to the first port of an ((i mod N)+1)th PCIe bridge of the N PCIe bridges, N is a positive integer greater than or equal to 3, and i is a positive integer less than or equal to N. Each of the N PCIe bridges includes an address mapping chip, and the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges. The address mapping chip of each of the N PCIe bridges sets a first address table and a second address table, and each of the N PCIe bridges further includes a plurality of base address registers and a plurality of translation registers. Each of the plurality of base address registers is configured to deliver a base address packet of one of the N PCIe bridges according to the first address table or the second address table. The plurality of translation registers set to configurably edit a destination address of the base address packet according to the mapping relationship for forwarding the base address packet, wherein the second address table of the ith PCIe bridge is set to configurably map to a system address of an ((i mod N)+1)th server connected to the ith PCIe bridge.

A method for setting a ring network system using peripheral component interconnect express (PCIe) is disclosed according to an embodiment of the invention. The method includes the following steps: connecting N PCIe bridges so that a second port of an ith PCIe bridge of the N PCIe bridges is connected to a first port of an ((i mod N)+1)th PCIe bridge of the N PCIe bridges, wherein N is a positive integer greater than or equal to 3, i is a positive integer less than or equal to N, and each of the N PCIe bridges is connected to an individual server; and setting an address mapping chip of each of the N PCIe bridges so that the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges; wherein each of the N PCIe bridges includes a plurality of base address registers and a plurality of translation registers. Setting the address mapping chip of each of the N PCIe bridges includes the following steps: setting a first address table and a second address table of the address mapping chip of each of the N PCIe bridges; setting each of the plurality of base address registers to deliver a base address packet of one of the N PCIe bridges according to the first address table or the second address table; and setting each of the plurality of translation registers to configurably edit a destination address of the base address packet according to the mapping relationship for forwarding the base address packet; wherein the first address table of the ith PCIe bridge is set to configurably map to a system address of an (((i−2+N) mod N)+1)th server connected to the ith PCIe bridge.

A method for setting a ring network system using peripheral component interconnect express (PCIe) is disclosed according to another embodiment of the invention. The method includes the following steps: connecting N PCIe bridges so that a second port of an ith PCIe bridge of the N PCIe bridges is connected to a first port of an ((i mod N)+1)th PCIe bridge of the N PCIe bridges, wherein N is a positive integer greater than or equal to 3, i is a positive integer less than or equal to N, and each of the N PCIe bridges is connected to an individual server; and setting an address mapping chip of each of the N PCIe bridges so that the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges; wherein each of the N PCIe bridges includes a plurality of base address registers and a plurality of translation registers. Setting the address mapping chip of each of the N PCIe bridges include the following steps: setting a first address table and a second address table of the address mapping chip of each of the N PCIe bridges; setting each of the plurality of base address registers to deliver a base address packet of one of the N PCIe bridges according to the first address table or the second address table; and setting each of the plurality of translation registers to configurably edit a destination address of the base address packet according to the mapping relationship for forwarding the base address packet; wherein the second address table of the ith PCIe bridge is set to configurably map to a system address of an ((i mod N)+1)th server connected to the ith PCIe bridge.

The foregoing and the following description of the embodiments are intended to illustrate and explain the spirit and principles of the invention, and to provide a further explanation of the scope of the application claims.

DETAILED DESCRIPTION

In the following detailed description, for purposes of explanation, numerous specific details are set forth in order to provide a thorough understanding of the disclosed embodiments. According to the disclosure, however, that one or more embodiments may be practiced by those skilled in the art, and the skilled in the art could understand the related aspects and advantages of the invention in accordance with the disclosed contents, claims and figures. The following embodiments further describe in detail the aspects of the invention, which, however, are not intended to limit the invention.

Figure 1:
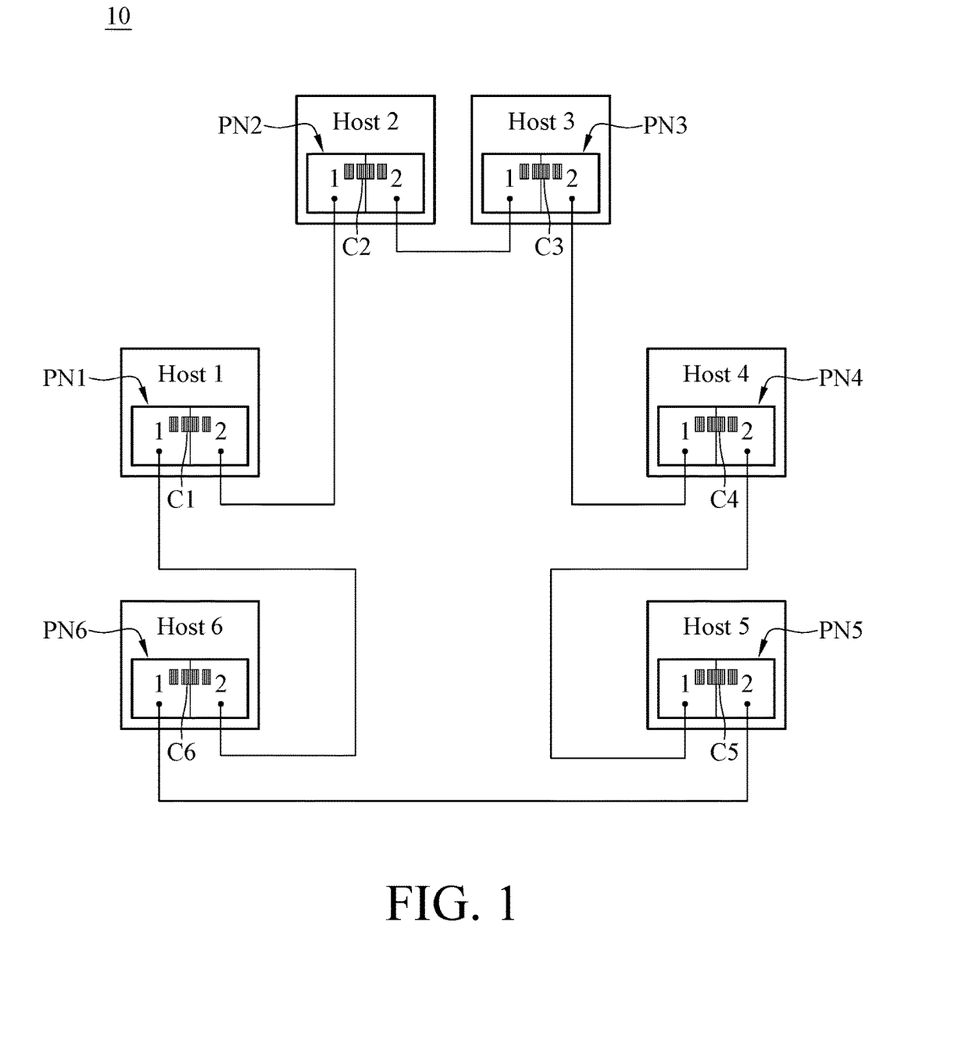
FIG. 1 is a block diagram of a ring network system according to an exemplary embodiment of the invention.

Please refer to FIG. 1, which is a block diagram of a ring network system according to an exemplary embodiment of the invention. As shown in FIG. 1, a ring network system 10 includes a plurality of servers host1-host6. Peripheral component interconnect express (PCIe) bridges PN1-PN6 are respectively configured in the servers host1-host6. Each of the PCIe bridges PN1-PN6 includes a first port 1 and a second port 2. In the exemplary embodiment of FIG. 1, the servers host1-host6 are connected through the PCIe bridges PN1-PN6 for forming a ring structure. For example, the second port 2 of the PCIe bridge PN1 in the server host1 is connected to the first port 1 of the PCIe bridge PN2 in the server host2. The second port 2 of the PCIe bridge PN2 in the server host2 is connected to the first port 1 of the PCIe bridge PN3 in the server host3, and so on. In this embodiment, the second port 2 of the PCIe bridge PN6 in the server host6 is connected to the first port 1 of the PCIe bridge PN1 in the server host1. Therefore, the structure of the ring network system 10 is configured as shown in FIG. 1. In an example, the PCIe bridges PN1-PN6 are devices supporting non-transparent bridges (NTB).

Figure 2A:
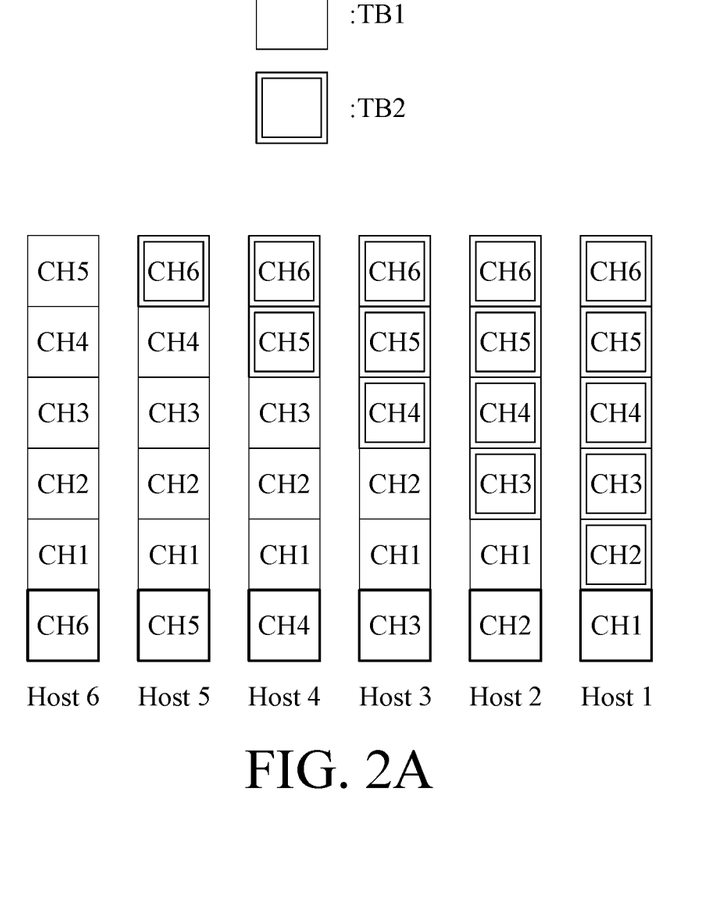
FIG. 2A is a schematic diagram of a first address table and a second address table correspondingly mapped out by the address mapping chip according to an exemplary embodiment of the invention.

PCIe bridges PN1-PN6 each includes an address mapping chip, C1-C6 respectively. Please refer to FIG. 1 and FIG. 2A. FIG. 2A is a schematic diagram of a first address table and a second address table correspondingly mapped out by the address mapping chip according to an exemplary embodiment of the invention. In the figures of the invention, square frames with thin lines in each server represent a first address table TB1, and the double square frames in each server represent a second address table TB2. As shown in 2A, each of the address mapping chips C1-C6 correspondingly maps out its first address table TB1 and second address table TB2. The first address table TB1 and the second address table TB2 maps to address of each of at least portion of the plurality of PCIe bridges PN1-PN6. For example, the first address table TB1 of the address mapping chip C4 in the server host4 maps to the addresses CH1-CH3 of the precedent PCIe bridges PN1-PN3. The second address table TB2 of the address mapping chip C4 maps to the addresses CH5-CH6 of the successive PCIe bridges PN5-PN6. The first address table TB1 of the address mapping chip C5 maps to the addresses CH1-CH4 of the precedent PCIe bridges PN1-PN4. The second address table TB2 of the address mapping chip C5 maps to the address CH6 of the successive PCIe bridge PN6. The first address table TB1 of the last address mapping chip C6 maps to the addresses CH1-CH5 of the precedent PCIe bridges PN1-PN5. In this embodiment, the first address mapping chip C1 does not set its first address table TB1, and the last address mapping chip C6 does not set its second address table TB2.

Figure 2B:
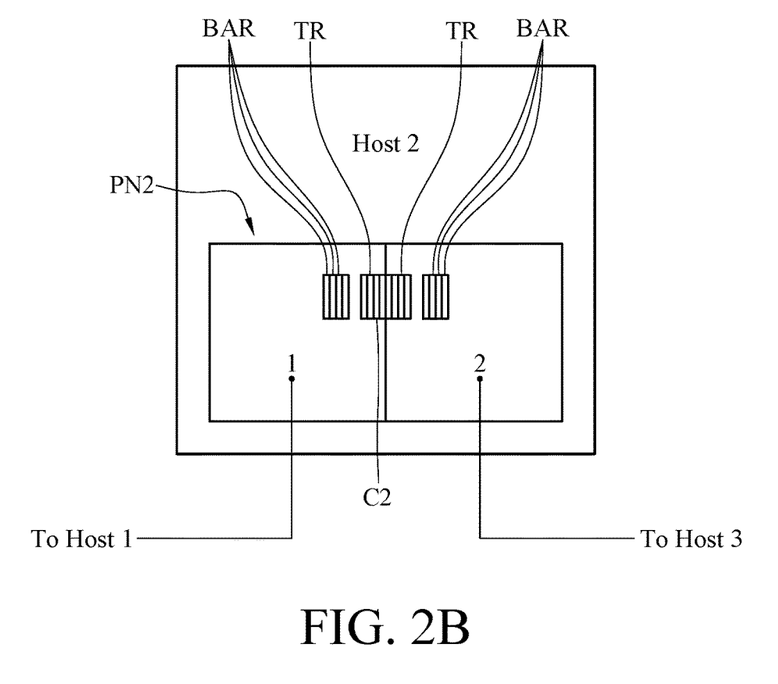
FIG. 2B is a block diagram of a server according to an exemplary embodiment of the invention.

In this embodiment, the address mapping chip of a PCIe bridge further sets an address mapping relationship between the PCIe bridge and the PCIe bridge(s) connected to the PCIe bridge. In an example, each of the PCIe bridges PN1-PN6 may respectively include two NTBs, and each of the NTBs includes a translation register (TR) and a plurality of base addresses registers (BAR). Please further refer to FIG. 2B, which is a block diagram of a server according to an exemplary embodiment of the invention. Take the bridge PN2 of the server host2 as an example, as shown in FIG. 2B, the bridge PN2 includes an address mapping chip C2 and a plurality of base address registers BAR. The address mapping chip C2 includes a plurality of translation registers TR. Each of the base address registers BAR is configured to deliver a base address package of one of a plurality of PCIe bridges according to the first address table TB1 or the second address table TB2. Each of the translation registers TR is set to configurably edit a destination address of the base address package according to the address mapping relationship for forwarding the base address package. For example, the translation registers TR are configured to set translation settings to achieve the address mapping, so that the base address package could be delivered to the destination address. In an implementation, after the initialization of systems, each of the systems arranges a system address (e.g. each of the square frames with thick lines in FIG. 2A) for setting addresses CH1-CH6. In addition to the aforementioned system address, each of the systems further includes a plurality of unused address spaces. Through those unused address spaces and setting a proper address mapping relationship, a PCIe network system could be built (such as the ring network system 10 shown in FIG. 1).

Please refer to the embodiment of FIG. 2A for illustrating the address mapping relationship between the PCIe bridges. When the servers host1-host6 are connected through the PCIe bridges PN1-PN6, each of the servers host1-host6 may map its unused address spaces to its precedent or successive servers' in-use addresses. For example, the server host6 maps its unused address space to the address CH5 of the server host5. The server host5 maps the unused address space to the address CH4 of the server host4, and so on. On the other hand, the server host1 maps its unused address space to the address CH2 of the server host2. The server host2 maps its unused address space to the address CH3 of the server host3, and so on. In this embodiment, the servers host1-host6 define their address ranges such as 64 bits through their own base address registers. The base address registers are mainly used for dynamically allocating address spaces.

Figure 3:
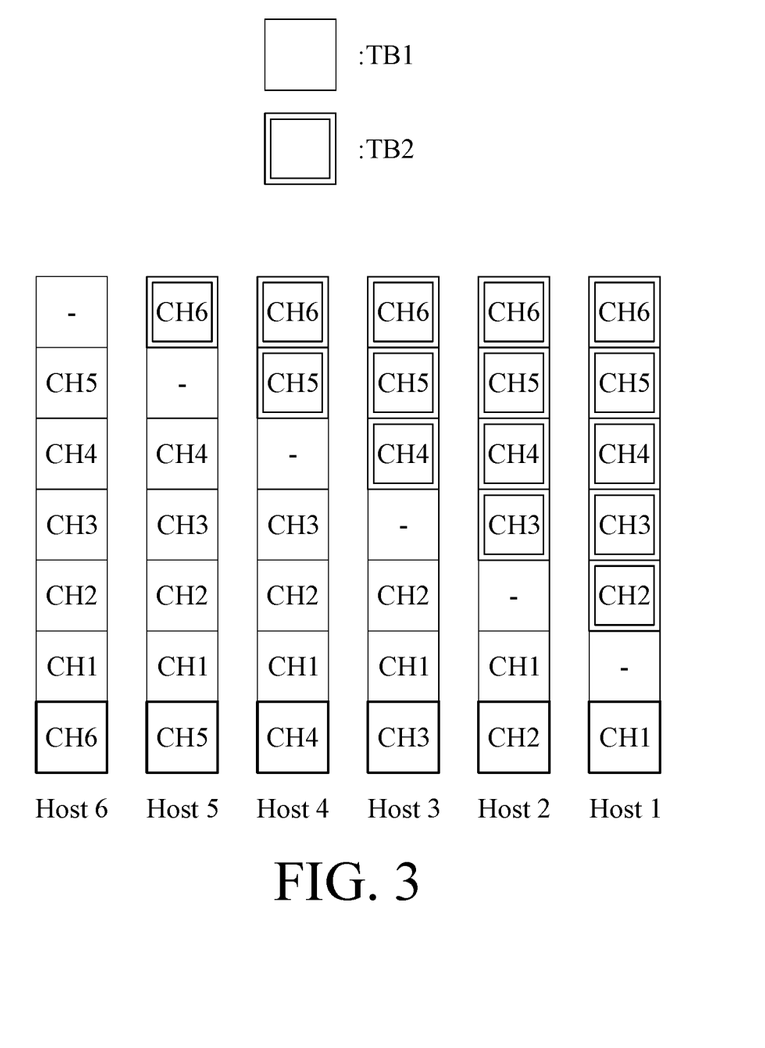
FIG. 3 is a schematic diagram of a first address table and a second address table correspondingly mapped out by an address mapping chip according to another exemplary embodiment of the invention.

Furthermore, each server may further map its remaining unused address space to its successive server's in-use addresses. For example, the server host4 may map its unused address space to the address CH6 in the server host5, the server host3 may map its unused addresses spaces to the addresses CH5-CH6 in the server host4. Then, the server host2 may map its unused address spaces to the addresses CH4-CH6 in the server host3, and so on. Then the second address table TB2 of the servers host1-host5 as shown in FIG. 2A is obtained (such as the double square frames with thin lines in FIG. 2A). On the other hand, the server host3 may map its unused address space to the address CH1 of the server host2, the server host4 may map its unused address spaces to the addresses CH1-CH2 in the server host3. The server host5 may further map its unused address spaces to the addresses CH1-CH3 in the server host4, and so on. Then the first address table TB1 of the server host2-host6 is obtained as shown in FIG. 2A. Please refer to FIG. 3, which is a schematic diagram of a first address table TB1 and a second address table TB2 correspondingly mapped out by an address mapping chip according to another exemplary embodiment of the invention. The address mapping set by the first address table TB1 and the second address table TB2 shown in FIG. 3 is similar to the address mapping set by the first address table TB1 and the second address table TB2 shown in FIG. 2A, so not repeated here. The difference between FIG. 2 and FIG. 3 is that, in the embodiment of FIG. 3, each of the servers host1-host6 includes an additional unused address space for storing another address.

After obtaining the first address table TB1 and the second address table TB2 of FIG. 2 or FIG. 3, each of the servers host1-host6 shown in FIG. 1 is capable of accessing a system address of another server through its own first address table or second address table. For example, if the server host6 would like to access its precedent server host3, the server host6 may achieve the access to the precedent server host3 by accessing the address CH3 in its TB1, according to the first address table TB1 of FIG. 2A or FIG. 3. In another example, if the server host4 would like to access its successive server host6, the server host4 may achieve the access to the successive server host6 by accessing the address CH6 in its TB2, according to the first address table TB2 of FIG. 2A or FIG. 3. In other words, in the embodiment of FIG. 2A or FIG. 3, each of the servers could access its precedent servers through the first address table TB1. On the other hand, each of the servers could access its successive servers through the second address table TB2. In an implementation, when a PCIe package arrives at a PCIe bridge, the PCIe bridge delivers the arrived PCIe package to a destination address according to a predetermined translation setting (such as address mapping). For example, in FIG. 2A, the PCIe bridge PN4 of the server host4 is capable of delivering a package to the server host2 according to a predetermined translation setting.

Figure 4:
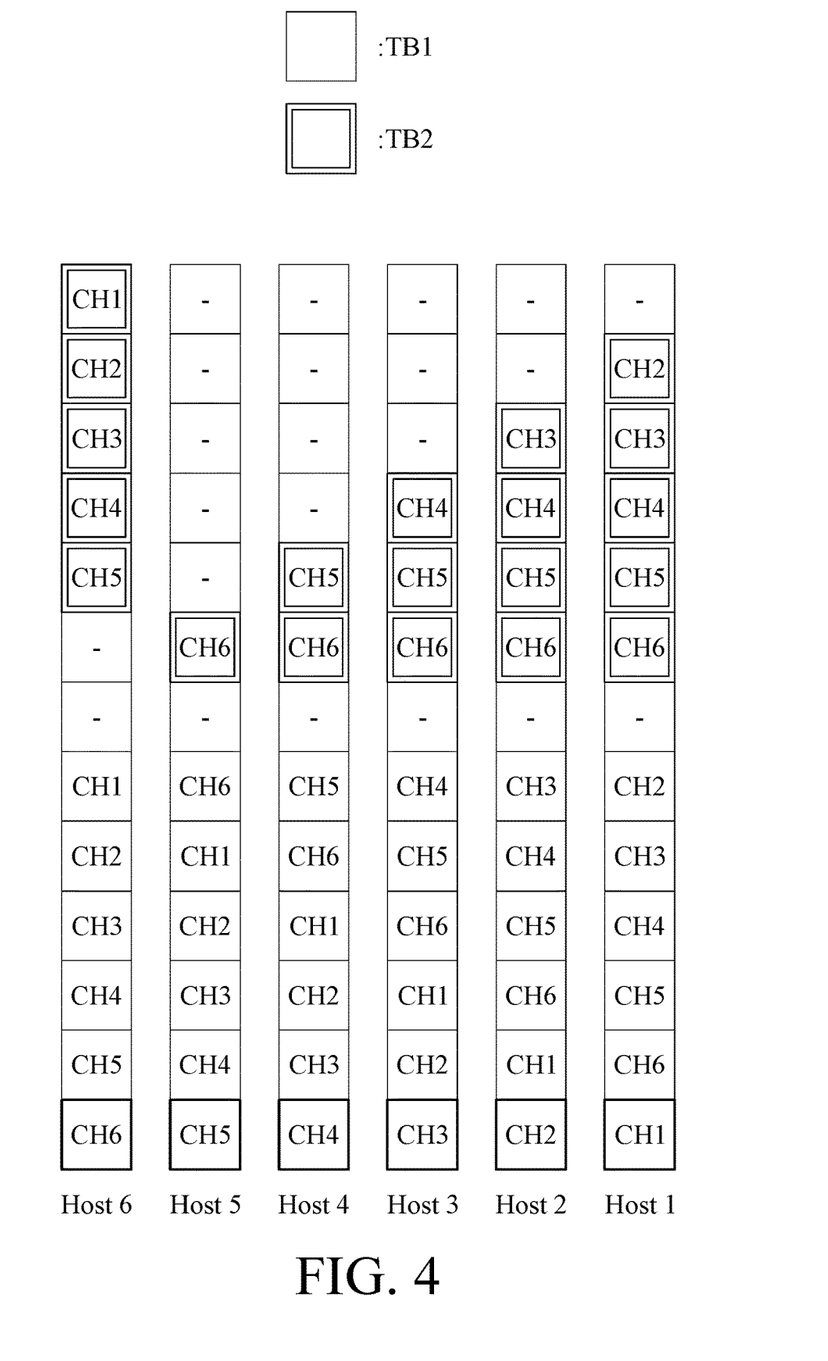
FIG. 4 is a schematic diagram of a first address table and a second address table correspondingly mapped out by an address mapping chip according to another exemplary embodiment of the invention.

Please refer to FIG. 4, which is a schematic diagram of a first address table TB1 and a second address table TB2 correspondingly mapped out by an address mapping chip according to another exemplary embodiment of the invention. As shown in FIG. 4, the first address table TB1 and the second address table TB2 of each of the PCIe bridges PN1-PN6 could map to addresses of other PCIe bridges except its own address (in the square frame with thick lines). Take the server host3 as an example, the first address table TB1 of the address mapping chip C3 in the PCIe bridge PN3 maps to the addresses CH1-CH2 and CH4-CH6, and the second address table TB2 of the address mapping chip C3 in the PCIe bridge PN3 maps to the addresses CH4-CH6. Take the server host5 as an example, the first address table TB1 of address mapping chip C5 in the PCIe bridge PN5 maps to the addresses CH1-CH4 and CH6, and the second address table TB2 of address mapping chip C5 in the PCIe bridge PN5 maps to the address CH6. In this embodiment, an address mapping chip of a PCIe bridge may set a mapping relationship between addresses in a first address table TB1 of the PCIe bridge and addresses in a first address table TB1 of a precedent PCIe bridge connected to the PCIe bridge. For example, in the embodiment of FIG. 4, the server host2 may map its unused address space to the address CH1 of the server host1. The server host3 may map its unused address spaces to the addresses CH1-CH2 of the server host2. And the server host4 may map its unused address spaces to the addresses CH1-CH3 of the server host3, and so on. Moreover, in this embodiment, the server host1 may map its unused address spaces to the addresses CH2-CH6 of the server host6. Then, the server host2 may map its unused address spaces to the addresses CH3-CH6 of the server host1. The server host3 may map its unused address spaces to the addresses CH4-CH6 of the server host2, and so on. So as the first address table TB1 of FIG. 4 is obtained. In an embodiment, a mapping relationship of a PCIe bridge i may further set the addresses of its precedent PCIe bridge (i−1) in the first address table TB1, pointing to the devices connected to the PCIe bridges (i+1) to N which connected to the PCIe bridge (i−1). Here i is a positive integer less than or equal to N. For example, if the server host4 would like to access the server host5 and host6, the server host4 may access the devices of the server host5 and host6 by accessing the address CH5 and CH6 in its TB1, according to the first address table TB1 of FIG. 4.

On the other hand, an address mapping chip of a PCIe bridge sets a mapping relationship between multiple addresses of a second address table TB2 of the PCIe bridge's successive PCIe bridge and multiple addresses of a second address table TB2 of the PCIe bridge. For example, each of the servers host1-host6 may map its unused address space to a system address of its successive server. Therefore, each of the servers host1-host6 includes a PCIe bridge address of its successive server. Each of the servers host1-host4 may further map its unused address space to the address of its successive server. For example, the server host4 may map its unused address space to the address CH6 in the server host5. Then the server host3 maps its unused address spaces to the addresses CH5-CH6 in the server host4. Then the server host2 may map its unused address spaces to the addresses CH4-CH6 in the server host3, and so on. On the other hand, the last server host6 maps its unused address spaces to the addresses CH2-CH5 of its precedent PCIe bridges PN2-PN5. So as the second address table TB2 in FIG. 4 is obtained. In the embodiment of FIG. 4, each of the servers host1-host6 is capable of accessing to other servers through the first address table TB1 and the second address table TB2 of FIG. 4. For example, if the server host5 would like to access to the server host3, the server host5 could access to the server host3 indirectly by accessing the address CH3 in its TB1, according to the first address table TB1 of FIG. 4. In another embodiment, a mapping relationship of a PCIe bridge is set such that an address of a second address table of the PCIe's successive PCIe bridge, which indicates a device connected to the PCIe bridge. For example, when the server host2 would like to access to the server host3, the server host2 could access to the device connected to the server host3 by accessing the address CH3 in its TB2, according to the second address table TB2 of FIG. 4.

Figure 5:
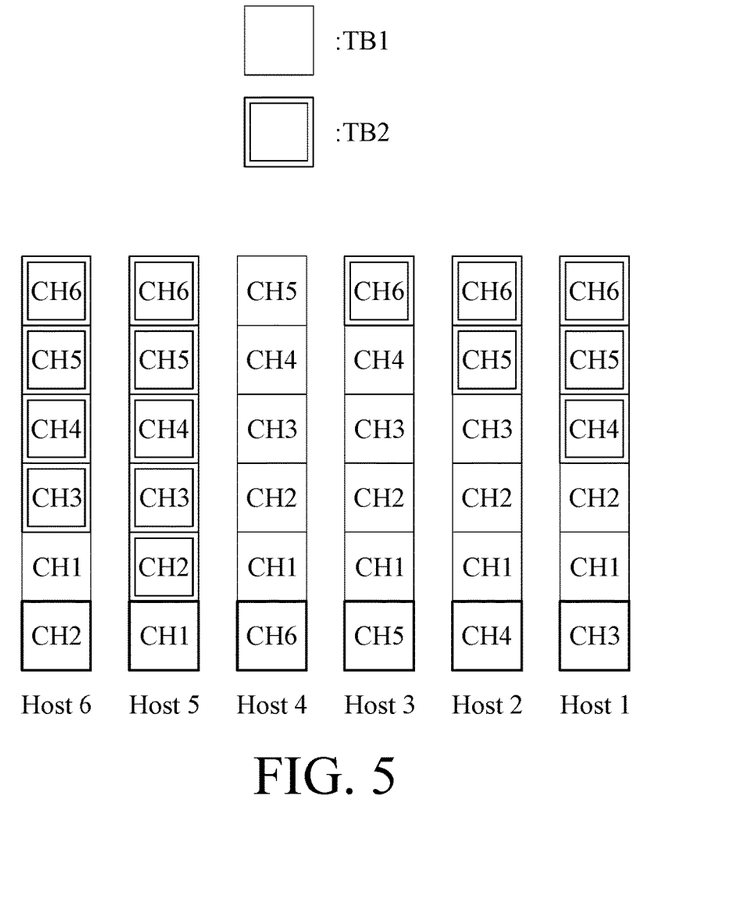
FIG. 5 is a schematic diagram of a first address table and a second address table correspondingly mapped out by an address mapping chip according to another exemplary embodiment of the invention.

In the embodiment of FIG. 2A and FIG. 3, when the ring network system 10 detects a disconnection between two of the PCIe bridges PN1-PN6, the ring network system 10 resets the first address table TB1, the second address table TB2 and the mapping relationship, so that one of the two PCIe bridges disconnected is reset to be the numbered one bridge of the PCIe bridges PN1-PN6. For example, assume that server host4 accesses to the server host5. When the ring network system 10 detects a disconnection between the server host4 and the server host5, the ring network system 10 resets the first address table TB1, the second address table TB2 and the mapping relationship. Please refer to FIG. 2A and FIG. 5. FIG. 5 is a schematic diagram of a first address table and a second address table correspondingly mapped out by an address mapping chip according to another exemplary embodiment of the invention. FIG. 5 represents the first address table and the second address table which are reset as a disconnection between the server host4 and the server host5 happens. Compared to FIG. 2, the first address table TB1 and the second address table TB2 shown in FIG. 5 indicates that address shifts happen in the first address table TB1 and the second address table TB2, so that the second address table TB2 corresponding to the server host5 turns to be the original second address table TB2 corresponding to the server host1, and the first address table TB1 corresponding to the server host4 turns to be the original first address table TB1 corresponding to the server host6. In other words, in the embodiment of FIG. 5, the PCIe bridge of the server host5 is reset to be the numbered one bridge of those PCIe bridges, and the PCIe bridge of the server host4 is reset to be the numbered sixth bridge of those PCIe bridges. Therefore, the server host4 is capable of accessing the server host5.

Figure 6:
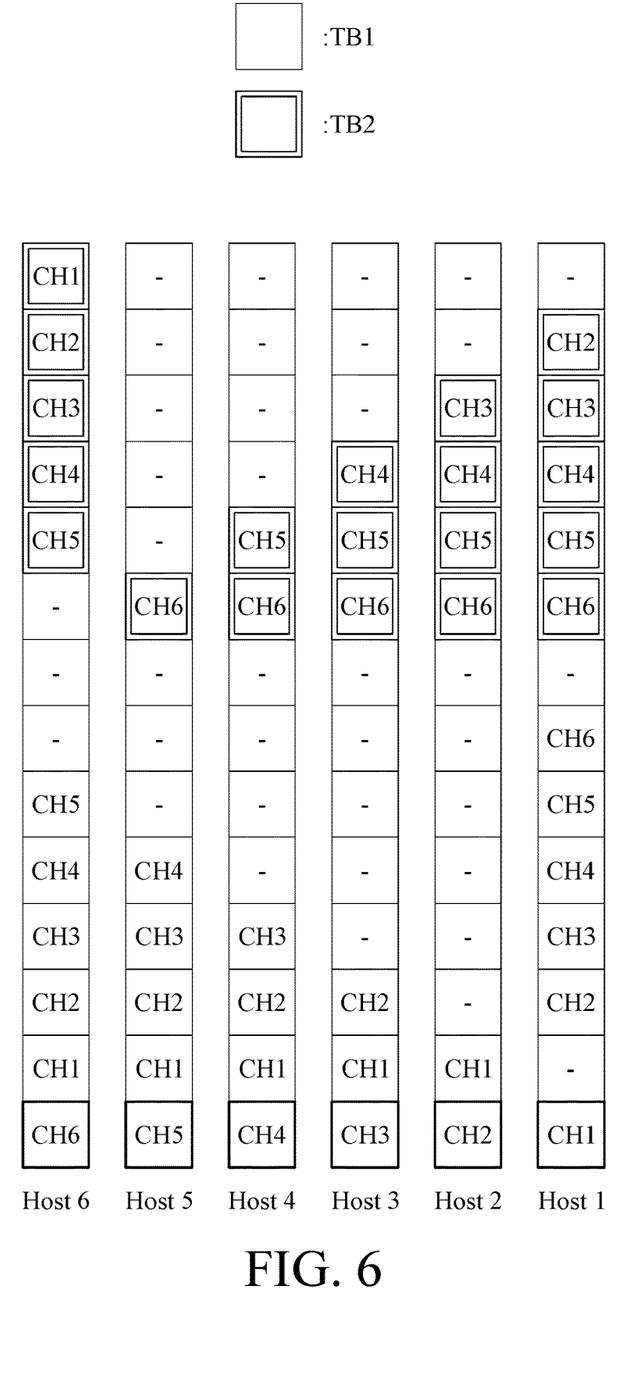
FIG. 6 is a schematic diagram of a first address table and a second address table correspondingly mapped out by the address mapping chip according to another exemplary embodiment of the invention.

Please refer to FIG. 6, which is a schematic diagram of a first address table and a second address table mapped by the address mapping chip according to another exemplary embodiment of the invention. In this embodiment, a first address table TB1 of a PCIe bridge maps to the addresses of the first PCIe bridge to the PCIe bridge's precedent PCIe bridge. For example, as shown in FIG. 6, the first address table TB1 of the PCIe bridge PN4 in the server host4 maps to the addresses CH1-CH3 of the PCIe bridge PN1-PN3. In this embodiment, an address mapping chip of a PCIe bridge sets a mapping relationship between at least one address of the first address table TB1 of the PCIe bridge and at least one address of the first address table TB1 of its precedent PCIe bridge. For example, in this embodiment, the server host2 may map its unused address space to the address CH1 of the server host1. The server host3 may map its unused address space to the address CH2 of the server host2, and so on. Therefore, each of the servers host1-host6 includes an address of its precedent. The server host3 may map its unused address space to the address CH1 in the server host2. And the server host4 may further map its unused address spaces to the addresses CH1-CH2 in the server host3, and so on. So as the first address table TB1 of FIG. 6 is obtained.

On the other hand, a second address table TB2 of a PCIe bridge maps to the address of its successive PCIe bridge till the address of the last PCIe bridge. For example, the second address table TB2 of the PCIe bridge PN2 in the server host2 maps to the addresses CH3-CH6 of PCIe bridges PN3-PN6 in the servers host3-host6. In another example, the second address table TB2 of the PCIe bridge PN4 in the server host4 maps to the addresses CH5-CH6 of the PCIe bridges PN5-PN6 in the servers host5-host6, In this embodiment, an address mapping chip of a PCIe bridge sets a mapping relationship between at least one address of the second address table TB2 of the PCIe bridge and at least one address of the second address table TB2 of the PCIe bridge's successive PCIe bridge.

For example, the server host5 may map the unused address space of the address mapping chip C5 in the PCIe bridge PN5 to the address CH6 of the server host6. The server host4 may map the unused address space of the address mapping chip C4 in the PCIe bridge PN4 to the address CH5 of the server host5. The server host3 may map unused address space of the address mapping chip C3 in the PCIe bridge PN3 to the address CH4 of the server host4, and so on. Therefore, each of the servers host1-host6 includes the address of its successive server. On the other hand, the server host4 may map its other unused address space to the address CH6 of the server host5. Then the server host3 may map its other unused addresses to the addresses CH5-CH6 of the server host4. Then the server host2 may map its other unused addresses to the addresses CH4-CH6 of the server host3, and so on. So as the second address table TB2 is obtained.

Figure 7:
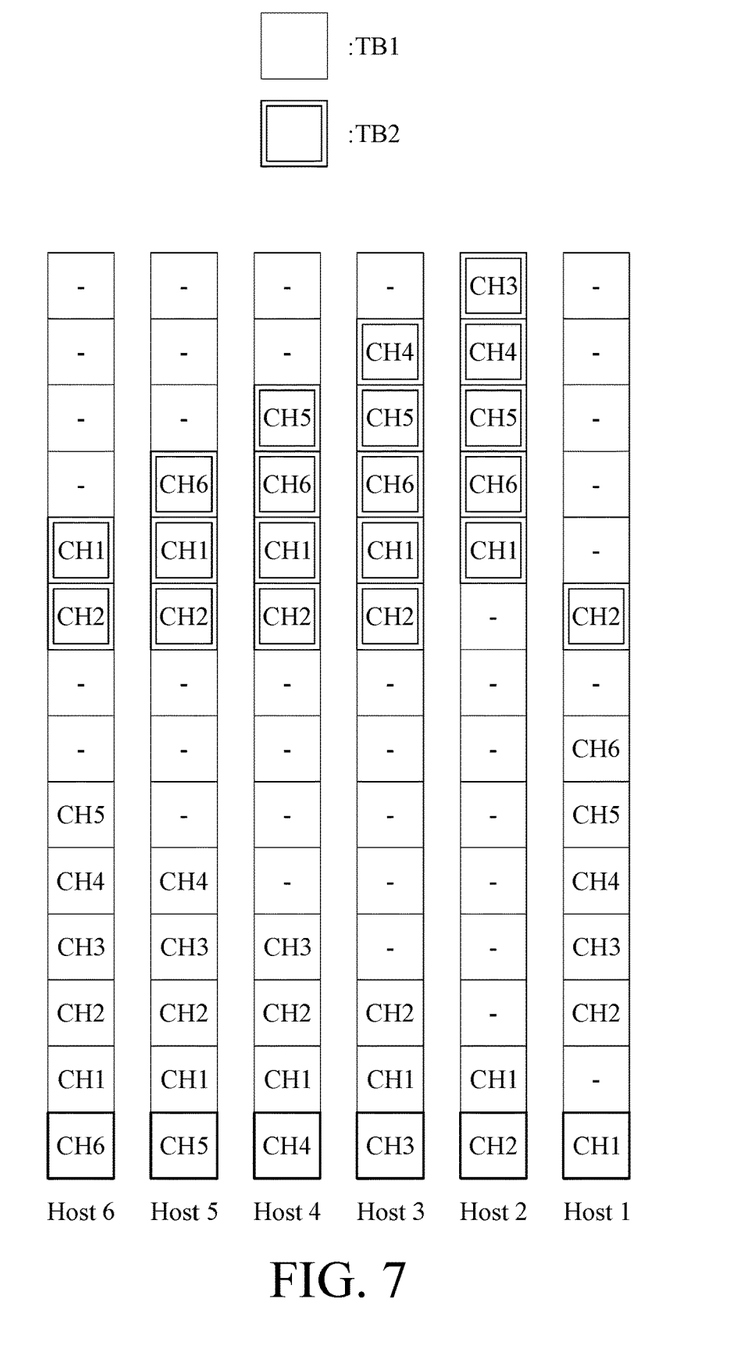
FIG. 7 is a schematic diagram of a first address table and a second address table correspondingly mapped out by an address mapping chip according to another exemplary embodiment of the invention.

Please refer to FIG. 7, which is a schematic diagram of a first address table and a second address table correspondingly mapped out by an address mapping chip according to another exemplary embodiment of the invention. The mapping method for obtaining the first address table in FIG. 7 is the same as in FIG. 6, so not repeated here. In the second address table TB2 of FIG. 7, an address mapping chip of a PCIe bridge sets a mapping relationship between at least one address of a second address table of the PCIe bridge and at least one address of a second address table of the PCIe bridge's successive PCIe bridge. In other words, in an example, the server host5 may map its unused address space of the address mapping chip C5 in the PCIe bridge PN5 to the address CH6 of the server host6. The server host4 may map its unused address space of the address mapping chip C4 in the PCIe bridge PN4 to the address CH5 of the server host5. The server host3 may map its unused address space of the address mapping chip C3 in the PCIe bridge PN3 to the address CH4 of the server host4, and so on. Therefore, each of the servers host1-host6 includes an address of its successive server. Furthermore, in this example, the server host6 may map its unused address space to the address CH2 of the server host1. The server host5 may map its unused address spaces to the addresses CH1-CH2 of the server host6. And the server host4 may map its unused addresses to the addresses CH1-CH2 and CH6 of the server host5, and so on. So as the second address table TB2 is obtained.

After obtaining the first address table TB1 and the second address table TB2 of FIG. 6 and FIG. 7, any server of FIG. 1 could access another server. For example, if the server host5 would like to access server host1, the server host5 may achieve an access to the server host1 by accessing the address CH1 in its TB1, according to the first address table TB1 of FIG. 6 or FIG. 7; or the server host5 may also achieve the access by accessing the address CH2 in its TB2, according to the second address table TB2 of FIG. 6 or FIG. 7. In another example, if the server host3 would like to access server host6, the server host3 may achieve an access to the server host6 by accessing the address CH6 in its TB2, according to the second address table TB2 of FIG. 6 or FIG. 7. In another example, if the server host5 would like to access server host4, the server H5 may achieve an access to the server host4 by accessing the address CH4 in its TB1, according to the first address table TB1 of FIG. 6 or FIG. 7. In the embodiment of FIG. 6 and FIG. 7, when the ring network system 10 detects a disconnection between two of the PCIe bridges PN1-PN6, the ring network system 10 may reset the first address table, second address table and the mapping relationship of the PCIe bridges, so that one of the two PCIe bridges disconnected is reset to be a numbered one bridge of the PCIe bridges PN1-PN6. In the embodiment of FIG. 6 and FIG. 7, about how the first address table TB1, the second address table TB2 and the mapping relationship are reset when the disconnection is detected are similar to the embodiments described in FIG. 2A and FIG. 3, so not repeated here.

Please refer to the embodiments of FIG. 2A, FIG. 3 to FIG. 7. According to those embodiments of the invention, a network system includes N PCIe bridges PN1-N. Each of the N PCIe bridges is connected to an individual server. Each of the N PCIe bridges PNi includes an address mapping chip Ci.

In an embodiment, a first address table of an ith PCIe bridge of the N PCIe bridges is set to configurably map to a system address of a $(((i-2+N) \bmod N)+1)$th server. In another embodiment, the first address table of the ith PCIe bridge of the N PCIe bridges may further set to configurably map to an address of each of at least portion of the PCIe bridges of the first address table of the $(((i-2+N) \bmod N)+1)$th PCIe bridge.

In an embodiment, a second address table of the ith N PCIe bridge of the N PCIe bridge is set to configurably map to a system address of a $((i \bmod N)+1)$th server. In another embodiment, the second address table of the ith PCIe bridge of the N PCIe bridges may further set to configurably map to an address of each of at least portion of the PCIe bridges of the second address table of the $((i \bmod N)+1)$th PCIe bridge. The N is a positive integer greater than or equal to 3, and the i is a positive integer less than or equal to N.

Furthermore, in another embodiment, the first address table of the ith PCIe bridge of the N PCIe bridges is set to configurably map to a system address of the $(((i-2+N) \bmod N)+1)$th server of the servers that is connected to the ith PCIe bridge of the N PCIe bridges, and the first address table of the ith PCIe bridge of the N PCIe bridges is set to configurably map to an address of each of at least portion of the PCIe bridges of the first address table of the $(((i-2+N) \bmod N)+1)$th PCIe bridge. And a second address table of the ith PCIe bridge of the N PCIe bridges is set to configurably map to a system address of a $((i \bmod N)+1)$th server. In another embodiment, the second address table of the ith PCIe bridge of the N PCIe bridges is further set to configurably map to an address of each of at least portion of PCIe bridges of second address table of the $((i \bmod N)+1)$th PCIe bridge. The N is a positive integer greater than or equal to 3, and the i is a positive integer less than or equal to N.

Figure 8A:
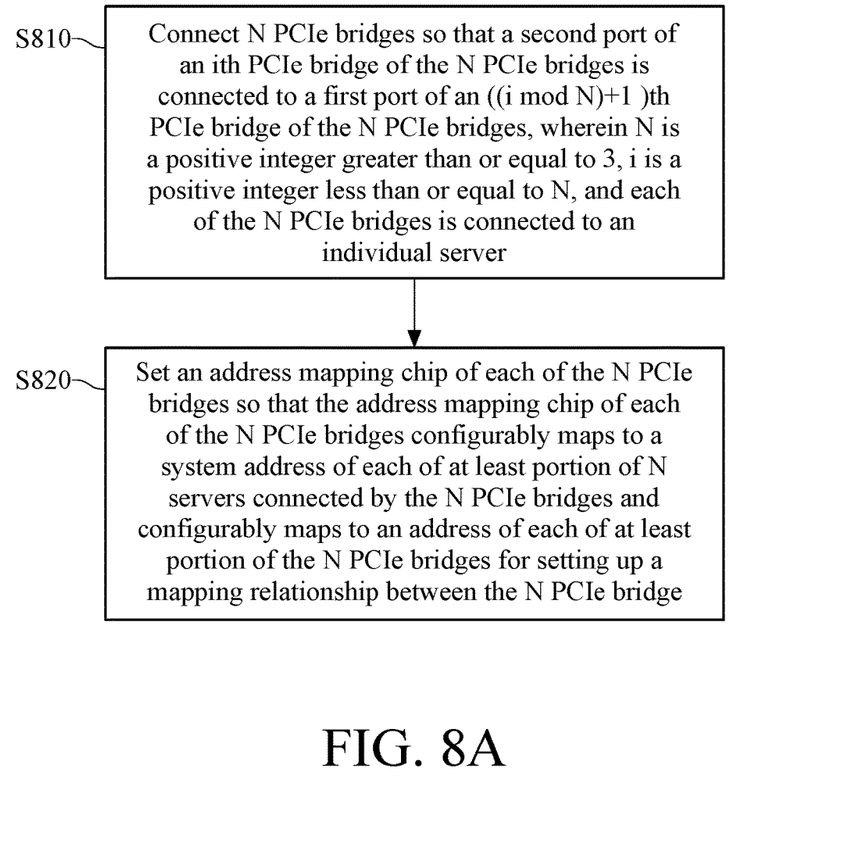
FIG. 8A is a flow chart of a method for setting a ring network system using peripheral component interconnect express (PCIe) according to an exemplary embodiment of the invention.

Please refer to FIG. 8A, which is a flow chart of a method for setting a ring network system using peripheral component interconnect express (PCIe) according to an exemplary embodiment of the invention. As shown in FIG. 8A, in step S810, connect N PCIe bridges so that a second port of an ith PCIe bridge of the N PCIe bridges is connected to a first port of an $((i \bmod N)+1)$th PCIe bridge of the N PCIe bridges, wherein N is a positive integer greater than or equal to 3, i is a positive integer less than or equal to N, and each of the N PCIe bridges is connected to an individual server. In step S820, set an address mapping chip of each of the N PCIe bridges so that the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges.

Figure 8B:
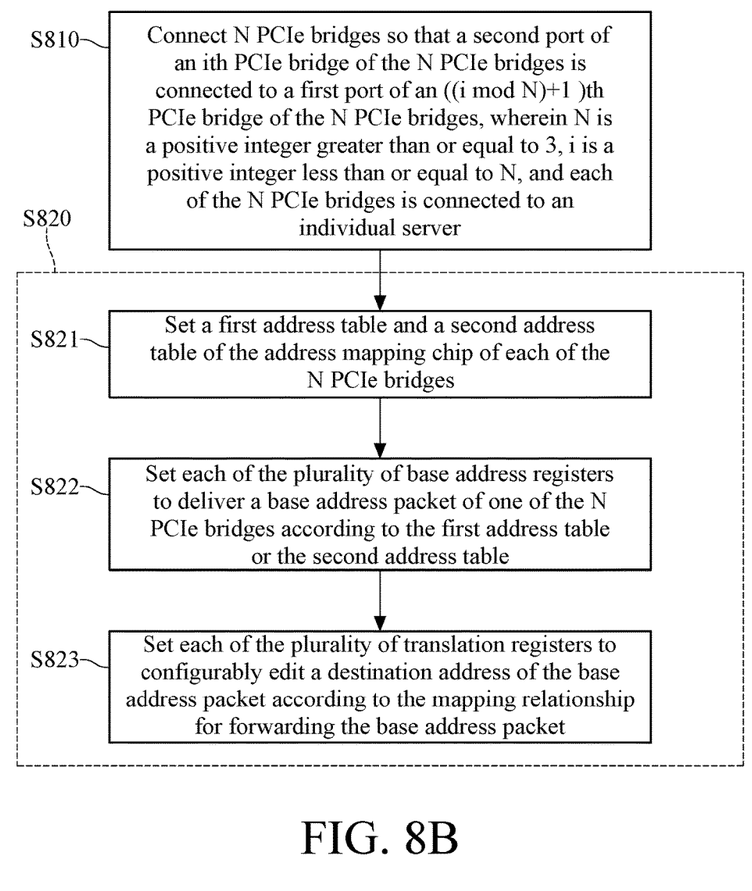
FIG. 8B is a flow chart of a method for setting a ring network system using peripheral component interconnect express (PCIe) according to an exemplary embodiment of the invention.

Please further refer to FIG. 8B, which is a flow chart of method for setting a ring network system using peripheral component interconnect express (PCIe) according to an exemplary embodiment of the invention. As shown in FIG. 8B, step S820 includes step S821. In step S821, set a first address table and a second address table of the address mapping chip of each of the N PCIe bridges and the first address table and the second address table both configurably map to an address of each of at least portion of the N PCIe bridges. In an embodiment, the address mapping chip further sets an address mapping relationship between the ith PCIe bridge and its precedent (i−1)th PCIe bridge, as well as an address mapping relationship between the ith PCIe bridge and its successive (i+1)th PCIe bridge. In an embodiment, the address mapping chip further sets an address mapping relationship between at least portion of addresses of the first address table of the ith PCIe bridge and at least portion of addresses of the first address table of the (i−1)th PCIe bridge, as well as an address mapping relationship between at least portion of addresses of the second address table of the ith PCIe bridge and at least portion of addresses of the second address table of the (i+1)th PCIe bridge.

In an embodiment, an ith PCIe bridge may include two NTBs, and each of the NTBs includes a plurality of base address registers and a translation register. In this embodiment, as shown in FIG. 8B, step S820 further includes step S822 and step S823. In step S822, set each of the plurality of base address registers to deliver a base address packet of one of the N PCIe bridges according to the first address table or the second address table. In step S823, set each of the plurality of translation registers to configurably edit a destination address of the base address packet according to the mapping relationship for forwarding the base address packet.

In an embodiment, a first address table of an ith PCIe bridge of the N PCIe bridges is set to configurably map to a system address of a (((i−2+N) mod N)+1)th server. In another embodiment, the first address table of the ith PCIe bridge of the N PCIe bridges may further set to configurably map to an address of each of at least portion of the PCIe bridges of the first address table of the (((i−2+N) mod N)+1)th PCIe bridge.

In an embodiment, a second address table of the ith N PCIe bridge of the N PCIe bridge is set to configurably map to a system address of a ((i mod N)+1)th server. In another embodiment, the second address table of the ith PCIe bridge of the N PCIe bridges may further set to configurably map to an address of each of at least portion of the PCIe bridges of the second address table of the ((i mod N)+1)th PCIe bridge. The N is a positive integer greater than or equal to 3, and the i is a positive integer less than or equal to N.

In an embodiment, the method for setting the ring network system in FIG. 8A and FIG. 8B, further includes the following steps. The first address table of the ith PCIe bridge maps to addresses of the first PCIe bridge to the (i−1)th PCIe bridge. The second address table maps to the addresses of the (i+1)th PCIe bridge to the Nth PCIe bridge. The address mapping chip of the ith PCIe bridge sets a mapping relationship between the addresses of the first address table of the ith PCIe bridge and the addresses of the first address table of the (i−1)th PCIe bridge, pointing to the addresses of the (i+1)th to the Nth PCIe bridge connected to the (i−1)th PCIe bridge, as well as the mapping relationship between the addresses of the second address table of the ith PCIe bridge and the addresses of the second address table of the (i+1)th PCIe bridge.

In an embodiment, when a disconnection between two of the N PCIe bridges is detected, one of the two PCIe bridges disconnected is reset to be a numbered one bridge of the N PCIe bridges by resetting the first address table, the second address table and the mapping relationship of the ith PCIe bridge.

In an embodiment, the method for setting the ring network system in FIG. 8A and FIG. 8B, further includes that the mapping relationship of the ith PCIe bridge is set such that the address of the (i−1)th PCIe bridge in the first address table indicates a system address mapped by the (i−1)th PCIe bridge. In another embodiment, the method for setting the ring network system in FIG. 8A and FIG. 8B, further includes that the mapping relationship of the ith PCIe bridge is set such that the address of the (i+1)th PCIe bridge in the second address table indicates a system address mapped by the (i+1)th PCIe bridge.

As described above, in an embodiment of the ring network system in accordance with the invention, a plurality of servers may be connected through a first port and a second port of each of the PCIe bridges for forming a ring structure. Each of the servers is capable of accessing to another server or using a device of another server by memory mapping. Therefore, resources of those servers could be shared, such as RAM, storage devices, network interface cards or similar devices etc.

Although the invention has been described above with reference to aforementioned embodiments, which, however, are not intended to limit the invention. Various changes and modifications that be made therein without departing from the spirit and scope of the invention are within the invention claimed scope. Accordingly, the scope of protection of the invention is defined by the appended claims.

What is claimed is:

1. A ring network system using peripheral component interconnect express (PCIe), comprising:
N PCIe bridges, each of which is connected to an individual server and comprises a first port and a second port, wherein the second port of an ith PCIe bridge of the N PCIe bridges is connected to the first port of an ((i mod N)+1)th PCIe bridge of the N PCIe bridges, N is a positive integer greater than or equal to 3, and i is a positive integer less than or equal to N, and
wherein each of the N PCIe bridges comprises an address mapping chip, the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges;
wherein the address mapping chip of each of the N PCIe bridges sets a first address table and a second address table, and each of the N PCIe bridges further comprises:
a plurality of base address registers, each of which is configured to deliver a base address packet of one of the N PCIe bridges according to the first address table or the second address table; and
a plurality of translation registers set to configurably edit a destination address of the base address packet according to the mapping relationship for forwarding the base address packet;
wherein the first address table of the ith PCIe bridge is set to configurably map to a system address of an (((i−2+N) mod N)+1)th server connected to the ith PCIe bridge.

2. The ring network system according to claim 1, wherein the first address table of the ith PCIe bridge is set to configurably map to an address of each of at least portion of PCIe bridges of the first address table of the (((i−2+N) mod N)+1)th PCIe bridge.

3. The ring network system according to claim 2, wherein the second address table of the ith PCIe bridge is set to configurably map to a system address of an ((i mod N)+1)th server connected to the ith PCIe bridge, and the second address table of the ith PCIe bridge is set to configurably map to an address of each of at least portion of PCIe bridges of the second address table of the ((i mod N)+1)th PCIe bridge.

4. The ring network system according to one of claim 1, wherein when a disconnection between two of the PCIe bridges is detected, one of the two of the PCIe bridges disconnected is reset to be a numbered one bridge of the N PCIe bridges by resetting the first address table, the second address table and the mapping relationship of the ith PCIe bridge.

5. A ring network system using peripheral component interconnect express (PCIe), comprising:
N PCIe bridges, each of which is connected to an individual server and comprises a first port and a second port, wherein the second port of an ith PCIe bridge of the N PCIe bridges is connected to the first port of an ((i mod N)+1)th PCIe bridge of the N PCIe bridges, N is a positive integer greater than or equal to 3, and i is a positive integer less than or equal to N, and
wherein each of the N PCIe bridges comprises an address mapping chip, the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges;
wherein the address mapping chip of each of the N PCIe bridges sets a first address table and a second address table, and each of the N PCIe bridges further comprises:
a plurality of base address registers, each of which is configured to deliver a base address packet of one of the N PCIe bridges according to the first address table or the second address table; and
a plurality of translation registers set to configurably edit a destination address of the base address packet according to the mapping relationship for forwarding the base address packet;
wherein the second address table of the ith PCIe bridge is set to configurably map to a system address of an ((i mod N)+1)th server connected to the ith PCIe bridge.

6. The ring network system according to claim 5, wherein the second address table of the ith PCIe bridge is set to configurably map to an address of each of at least portion of PCIe bridges of the second address table of the ((i mod N)+1)th PCIe bridge.

7. The ring network system according to one of claim 5, wherein when a disconnection between two of the PCIe bridges is detected, one of the two of the PCIe bridges disconnected is reset to be a numbered one bridge of the N PCIe bridges by resetting the first address table, the second address table and the mapping relationship of the ith PCIe bridge.

8. A method for setting a ring network system using peripheral component interconnect express (PCIe), comprising:
connecting N PCIe bridges so that a second port of an ith PCIe bridge of the N PCIe bridges is connected to a first port of an ((i mod N)+1)th PCIe bridge of the N PCIe bridges, wherein N is a positive integer greater than or equal to 3, i is a positive integer less than or equal to N, and each of the N PCIe bridges is connected to an individual server; and
setting an address mapping chip of each of the N PCIe bridges so that the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges;
wherein each of the N PCIe bridges comprises a plurality of base address registers and a plurality of translation registers, wherein setting the address mapping chip of each of the N PCIe bridges comprises:
setting a first address table and a second address table of the address mapping chip of each of the N PCIe bridges;
setting each of the plurality of base address registers to deliver a base address packet of one of the N PCIe bridges according to the first address table or the second address table; and
setting each of the plurality of translation registers to configurably edit a destination address of the base address packet according to the mapping relationship for forwarding the base address packet;
wherein the first address table of the ith PCIe bridge is set to configurably map to a system address of an (((i−2+N) mod N)+1)th server connected to the ith PCIe bridge.

9. The method according to claim 8, wherein the first address table of the ith PCIe bridge is set to configurably map to an address of each of at least portion of PCIe bridges of the first address table of the (((i−2+N) mod N)+1) PCIe bridge.

10. The method according to claim 9, wherein the second address table of the ith PCIe bridge is set to configurably map to a system address of an ((i mod N)+1)th server connected to the ith PCIe bridge, and the second address table of the ith PCIe bridge of the N PCIe bridges is set to configurably map to an address of each of at least portion of the PCIe bridges of the second address table of the ((i mod N)+1)th PCIe bridge.

11. The method according to claim 8, further comprising:
when a disconnection between two of the PCIe bridges is detected, one of the two of the PCIe bridges disconnected is reset to be a numbered one bridge of the N PCIe bridges by resetting the first address table, the second address table and the mapping relationship of the ith PCIe bridge.

12. A method for setting a ring network system using peripheral component interconnect express (PCIe), comprising:
connecting N PCIe bridges so that a second port of an ith PCIe bridge of the N PCIe bridges is connected to a first port of an ((i mod N)+1)th PCIe bridge of the N PCIe bridges, wherein N is a positive integer greater than or equal to 3, i is a positive integer less than or equal to N, and each of the N PCIe bridges is connected to an individual server; and
setting an address mapping chip of each of the N PCIe bridges so that the address mapping chip of each of the N PCIe bridges configurably maps to a system address of each of at least portion of N servers connected by the N PCIe bridges and configurably maps to an address of each of at least portion of the N PCIe bridges for setting up a mapping relationship between the N PCIe bridges;
wherein each of the N PCIe bridges comprises a plurality of base address registers and a plurality of translation registers, wherein setting the address mapping chip of each of the N PCIe bridges comprises:
setting a first address table and a second address table of the address mapping chip of each of the N PCIe bridges;
setting each of the plurality of base address registers to deliver a base address packet of one of the N PCIe bridges according to the first address table or the second address table; and
setting each of the plurality of translation registers to configurably edit a destination address of the base address packet according to the mapping relationship for forwarding the base address packet;

wherein the second address table of the ith PCIe bridge is set to configurably map to a system address of an ((i mod N)+1)th server connected to the ith PCIe bridge.

13. The method according to claim 12, wherein the second address table of the ith PCIe bridge is set to configurably map to an address of each of at least portion of PCIe bridges of the second address table of the ((i mod N)+1)th PCIe bridge.

14. The method according to claim 12, further comprising:

when a disconnection between two of the PCIe bridges is detected, one of the two of the PCIe bridges disconnected is reset to be a numbered one bridge of the N PCIe bridges by resetting the first address table, the second address table and the mapping relationship of the ith PCIe bridge.

* * * * *